(12) United States Patent
Rasheed (10) Patent No.: US 9,097,820 B2
(45) Date of Patent: Aug. 4, 2015

(54) LOOK AHEAD ADVANCE FORMATION EVALUATION TOOL

(76) Inventor: Wajid Rasheed, Slough (GB)

(*) Notice: Subject to any disclaimer, the term of this patent is extended or adjusted under 35 U.S.C. 154(b) by 230 days.

(21) Appl. No.: 13/519,982

(22) PCT Filed: Dec. 10, 2010

(86) PCT No.: PCT/IB2010/055752
§ 371 (c)(1), (2), (4) Date: Jun. 29, 2012

(87) PCT Pub. No.: WO2011/080640
PCT Pub. Date: Jul. 7, 2011

(65) Prior Publication Data
US 2012/0273270 A1    Nov. 1, 2012

(30) Foreign Application Priority Data
Dec. 30, 2009 (GB) .................. 0922667.1

(51) Int. Cl.
| | |
|---|---|
| *E21B 47/01* | (2012.01) |
| *G01V 1/46* | (2006.01) |
| *E21B 44/00* | (2006.01) |
| *E21B 47/10* | (2012.01) |
| *E21B 49/00* | (2006.01) |

(52) U.S. Cl.
CPC ............... *G01V 1/46* (2013.01); *E21B 44/005* (2013.01); *E21B 47/01* (2013.01); *E21B 47/101* (2013.01); *E21B 49/00* (2013.01)

(58) Field of Classification Search
USPC ................................. 175/45; 702/6
See application file for complete search history.

(56) References Cited

U.S. PATENT DOCUMENTS

| | | |
|---|---|---|
| 3,161,256 A | 12/1964 | Pardue |
| 3,190,388 A | 6/1965 | Moser |
| 3,974,476 A | 8/1976 | Cowles |
| 4,757,873 A | 7/1988 | Linyaev |
| 4,800,537 A | 1/1989 | Mount, II |
| 4,802,145 A | 1/1989 | Mount, II |
| 4,867,264 A | 9/1989 | Siegfried |
| 4,916,400 A | 4/1990 | Best |
| 4,964,085 A | 10/1990 | Coope |
| 5,678,643 A | 10/1997 | Robbins |
| 6,088,294 A | 7/2000 | Leggett |
| 6,510,104 B1 | 1/2003 | Ikegami |
| 6,661,737 B2 | 12/2003 | Wisniewski |
| 6,899,197 B2 | 5/2005 | Arian |
| 6,907,348 B2 * | 6/2005 | Gaston et al. .................. 702/10 |
| 7,099,810 B2 | 8/2006 | Mandal |
| 8,125,848 B2 | 2/2012 | Geerits |
| 8,542,553 B2 | 9/2013 | Wang |
| 8,559,272 B2 | 10/2013 | Wang |
| 8,755,248 B2 | 6/2014 | Wang |
| 8,861,307 B2 | 10/2014 | Pabon |
| 2004/0158404 A1* | 8/2004 | Gaston et al. ..................... 702/6 |
| 2008/0130409 A1* | 6/2008 | Leggett, III et al. ............ 367/35 |
| 2008/0312839 A1* | 12/2008 | Mathiszik et al. ............... 702/11 |

* cited by examiner

*Primary Examiner* — William P Neuder (57) ABSTRACT

Apparatus, Tool and Method for Look-Ahead Advance Formation Evaluation which investigates the formation or formation characteristic in advance of the drill-bit before the formation or formation feature of interest has been penetrated or traversed.

A closed-loop real-time look-ahead formation evaluation tool which provides acoustic and/or electro-magnetic formation data beyond the drill-bit using a novel angular sensor orientation which also allows for optimized signal propagation and signal returns according to an axial plane and vertical depth.

19 Claims, 7 Drawing Sheets

Figure 9
Logic Circuit for Lookahead Formation Evaluation Tool

LOOK AHEAD ADVANCE FORMATION EVALUATION TOOL

FIELD OF THE INVENTION

This invention relates to a look-ahead or advance formation evaluation while drilling apparatus or tool that is capable of evaluating borehole and formation characteristics ahead of a drill-bit, directional control system or tubular, especially for use in wellbores in the oil and gas industry. The apparatus and tool find particular use in characterising formations and their geo-physical and petro-physical features principally using ultrasonic means, but can also be configured with electromagnetic sensors to provide other types of downhole characterisation.

On average, 65% of hydrocarbons are left underground this equates to a recovery rate of 35%. A look ahead logging tool would potentially help increase recovery rates. It is to be understood that the term 'look ahead' as used herein refers to the capacity of the invention to evaluate a formation according to a determined angular orientation and thus define a formation or a formation feature within a 3D cone of investigation that extends from the tool at a determined angle and reaches a given axial and true vertical depth ahead of the bit. In contrast, prior art logging tools are differentiated as behind the bit. The present invention has for a principal object a 'look ahead' capability to investigate formations ahead of the bit which distinguishes it from the prior art. The tool itself can also be configured with stabilisation or directional control features such as a rotary steerable without necessarily affecting the means of investigation.

Other aspects of the invention include a method of operating a lookahead apparatus or tool to determine formations ahead of the bit or before formations are penetrated and thereby increase hydrocarbon recovery factors by optimally placing wellbores; a method of focussing signal orientation angularly, axially and vertically ahead of a drill-bit; a method of focussing signal propagation angularly, axially and vertically ahead of a drillbit; an optimised sensing zone and use of additional sources, receivers or transducers housed in a drill-bit in conjunction with the apparatus or tool. In a further aspect, the invention relates to an apparatus for controlling logging and wellbore placement in real-time.

Although sonic investigation is a principal route to characterizing certain formations and their features, the invention is not limited to acoustic means. A further embodiment is envisaged with additional investigation means similarly integrated with the look-ahead capability of the tool. These additional means can include electro-magnetic waves suitably combined with acoustic measurements for optimal wellbore placement. Such a combination would allow acoustic or porosity measurements to be correlated with resistance or conductivity measurements for oil, gas and water zone identification.

Figure 1:
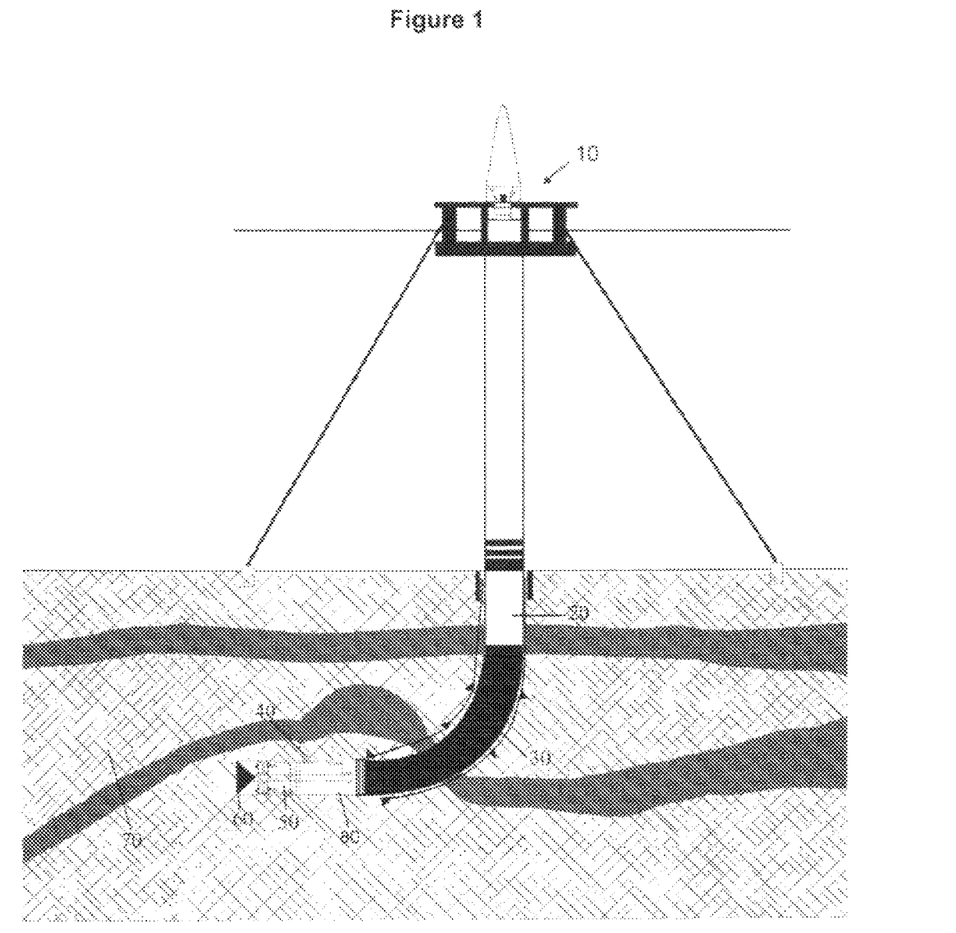
FIG. 1 is a general diagrammatic view of an oil or gas well showing rig surface structures (10) and the underground well (20), with a tool (50) in accordance with the invention as part of a bottomhole assembly (40) drilling a well (30) and indicating formations and formation features (70) located ahead of the drill-bit (60) and a wellbore (80)

When deciding the optimal trajectory and placement of an exploration or production well, numerous downhole activities are conducted to ensure the highest recovery of hydrocarbons and minimise the production of water over the well's life-span. Geo-physical data such as formation porosity, permeability, oil, water, gas contact zones, formation beds and dips are required to be known to steer the well to its optimal location. A variety of logging-while-drilling technology such as neutron density, gamma ray, resistivity and acoustic investigation tools are commonly used to identify formations and evaluate their features. (FIG. 1).

The present invention details an embodiment of a sound based formation evaluation tool which may be configured as a single tool, housing or module or several tools, housings or modules as an apparatus optimally located along a drill-string to form an improved logging measurement based on the projection of an acoustic or electro-magnetic signal ahead of the drill-bit, reflected back to a receiver and thereby achieve the purpose of the invention which is to evaluate a formation before it has been penetrated.

Several types of sound based investigation tools exist such as passive seismic that record natural seismic events, active seismic that generate and register sound waves from man-made sources and those known as acoustics (below 20,000 Hz) and those known as ultrasonic (above 20,000 Hz). It is understood that the term 'acoustic' may cover ultrasonic or other frequencies.

Seismic tools provide wide-scale geological data, however these have poor resolution of formation detail and drilling itself is the true test of geophysical formation characteristics. Therefore, there is a need for and reliance on real-time acoustic while drilling tools. These tools use transducers or sources to create high frequency sound waves which are propagated as shear or pressure waves in solids and fluids respectively. Sound waves are further classified as those travelling within the wellbore (Stoneley waves), the near formation as (Flexural waves) and far formation as (Body waves). Through an evaluation of the echo pulse, its maxima and minima, which are received back by the sensor/receiver, and derivations thereof, calculations, can be made as to the time interval between signal transmission and recording the echo to determine the distance to an object or formation feature. Further, using algorithms various characteristics such as formation density, void spaces, fluid saturations, fluid trapping and formation direction changes such as beds or dips all have definite signature velocities that correspond to their reflective ability.

Figure 2:
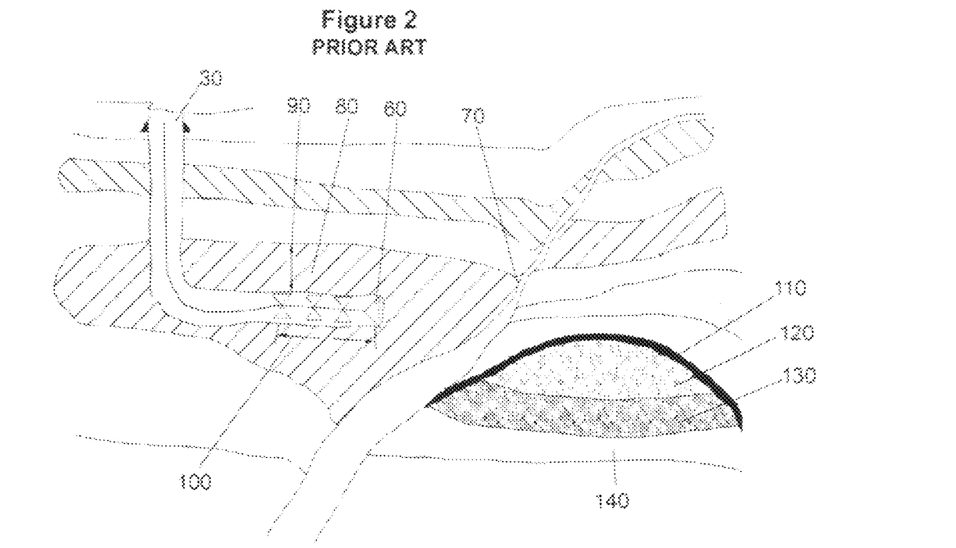
FIG. 2 is a downhole side view illustrating the limitations of prior art based on their distances behind the bit (100) limiting formation evaluation to those formations behind the bit and in a lateral orientation only (90) and formations (70) and formations features not investigated (110, 120, 130, 140)

In all of these applications, the prior art suffers from two major limitations (FIG. 2, 90, 100). Firstly, sensors which may be defined as sources and receivers or transducers in any configuration are located too far behind the bit for timely formation evaluation (100). The distances (100 feet [30 meters] or more) between sensors and the drill-bit restricts formation evaluation to the area nearest the sensor which is always in area that has already been penetrated and drilled through as it is behind the drill-bit. Second, the orientation of such sensors and the propagation of their acoustic pulses are lateral (90). This severely limits signal focus to allow for orthogonal investigation only (FIG. 2). Even where signal propagation is increased due to a plurality of sensor receiver arrays or due to deeper readings, the distance between such arrays and the drill-bit remains substantially unchanged so that formations are only evaluated once they have been drilled through. In this way, the prior art can only provide for formation evaluation subsequent to drilling. This is unsatisfactory as it prevents the optimal placement of wellbores due to the tardy arrival of formation data after wellbore placement has already occurred.

Measurement may involve the acquisition and communication to surface of various types of wellbore data such as resistivity, porosity, permeability, azimuth, inclination and borehole diameter or rugosity, formation dips or bedding angles.

Measurement itself occurs in two modes, either wireline or logging-while-drilling. Wireline is performed as a separate and consecutive activity to drilling involving the conveyance of measurement tools on a wire or cable. Wireline logging tools generally cannot be rotated and are not used in the while-drilling application for this reason.

Figure 3:
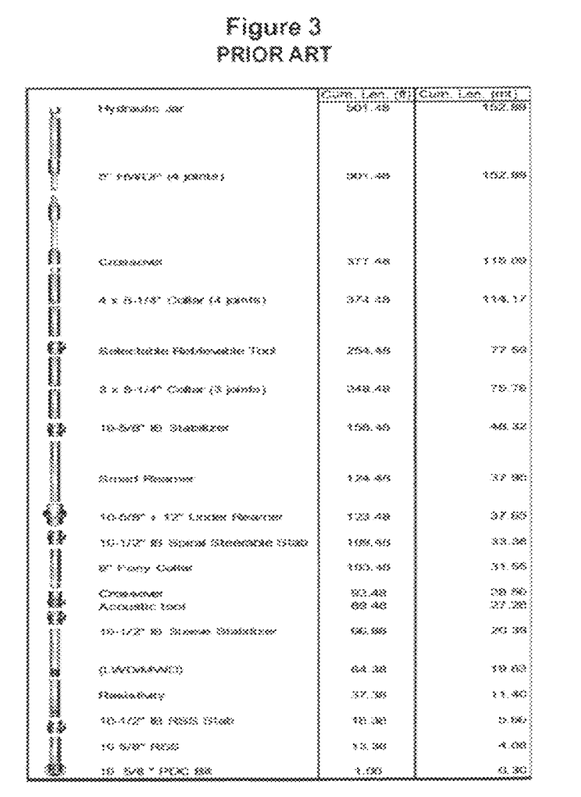
FIG. 3 is a downhole BHA showing detailed components and distances corresponding to FIG. 2

Logging-while-drilling tools acquire various data from the wellbore. Acoustic or ultrasonic tools may be incorporated within logging tools. As they can be rotated, such tools may be used while drilling to acquire sonic measurement data. However, they suffer from restrictions in placement and investigation depth (FIG. 2). Placement is restricted due to the requirements of the directional control system such as a rotary steerable or steerable motor which need to be configured near to the bit in order to provide deflection or orientation forces to the bit. Therefore, the location of the acoustic tool is within the BHA above the directional control system (FIG. 3). Further, the acoustic tool may be placed behind other logging tools which are numerous. These include Neutron Density, Resistivity, Gamma Ray. The cumulative distance of such logging tools may exceed 100' (30 m) behind the drill-bit and such tools can only give readings after the section has been drilled. Often the sonic tool alone is 36' (10 m) in length.

Sonic tools harness time-of-flight echo pulses to identify a given formation or interval transit time, designated '∂t'. Each formation has a sonic velocity or signature that is a measure of a formation's ability to transmit sound waves. Formation lithology, compressive strengths and rock types, notably, porosity or void spaces within the rock matrix have major affects on sonic velocities. In porous rocks there is a greater percentage of void space containing fluids which alters the sonic travel times as compared to a rock that has no void space. Sonic tools in this way measure travel time and many equations can be solved using derivatives of travel time and relationships. These include the time average equation which has total travel time dependent on the time the sonic wave spends travelling the solid portion of the rock, called the rock matrix and the time spent travelling through the fluids in the hollow portion of the rock, called the pores.

Acoustic or ultrasonic formation measurements rely heavily on the lateral orientation of acoustic sensors. Typically, in an attempt to increase the depth of investigation as well as create a wider zone of investigation, it is routine for prior art acoustic sensors and receivers to be placed in consecutive arrays. Irrespective, of the number of arrays, this approach does not resolve the problem of what is ahead of the bit, as measurements are taken from considerable distances behind the drill-bit or after drilling has already finalized the trajectory of the wellbore.

In the event of a productive hydrocarbon bearing zone having been bypassed or exited, there is a retrospective time-lag between the data being received showing where the hydrocarbons are located and the subsequent correction of wellbore placement. Often, the time-lag leads to uncertainty, additional cost and can be accompanied by a loss of production as hydrocarbons are bypassed or the optimal heel-to-toe configuration within a low permeability zone is lost. In the case of productive zones, characterization occurs only after drilling and the area has been traversed, which means that the payzone of the reservoir may be exited and further corrective drilling must occur to place the wellbore in the desired payzone. Such cycles of delayed formation data arrival and subsequent corrections can be eliminated with the present invention.

BACKGROUND OF THE INVENTION

Geological mapping and geophysical surveys allow oil companies to characterise their acquired acreage and the age and sedimentation patterns of the rock formation contained therein. This process of characterisation can be reconstructed as a visual earth model that delineates the position and shape of the structure including anticlines, faults-stratigraphy, structure which helps increase production from subsequent wells and from the field as a whole. However, the earth model and the well plan have inherent uncertainties.

Geological uncertainties and challenges are related to the location of the hydrocarbons, water contacts, traps, formation stresses, movements and reservoir porosity and permeability. To overcome these challenges, a highly detailed well plan is developed which contains the well objective, coordinates, legal, geological, technical and well engineering data and calculations. To resolve the uncertainties, however, drilling is the final test.

The data is used to plot a well profile using precise bearings which is designed in consecutive telescopic sections—surface, intermediate and reservoir. To deliver the well objective and maintain the integrity of well over its lifecycle, a given wellbore trajectory with multiple sections and diameters is drilled from surface. Although there are many variants, a simple vertical well design could include a surface or top-hole diameter of 17½" (445 mm), intermediate sections of 13⅝" (360 mm) and 9⅝" (245 mm) narrowing down to the bottom-hole diameter of 8½" (216 mm) in the reservoir section.

Scarcity of oil and gas is driving oil and gas companies to explore and develop reserves in more challenging basins such as those in water-depths exceeding 6,000 ft (1830 m) or below massive salt sections. These wells have highly complex directional trajectories and highly sophisticated formation evaluation requirements. Known in the art as '3D-designer' wells, these wells have highly complex trajectories due to the need to access various reservoirs with a single wellbore as well as the configuration of the hydrocarbon reservoirs. 3D wells and horizontal wells have created a need to 'geo-steer' the wellbore to avoid bypassing productive reservoir zones and guide the wellbore into the optimal production zone. On average, 65% of hydrocarbons are left underground this equates to a recovery rate of 35%. A look ahead logging tool would potentially help increase recovery rates.

Therefore, the bottom-hole assemblies that are needed to drill these wells routinely include acoustic, sonic or other sound based logging devices to characterize formations. In this way, logging is an integral part of well construction and there is now an increased dependence on logging for wellbore placement and formation evaluation.

Previously, the ultrasonic and electro-magnetic tool has been restricted in its placement above the drill-bit and limited to taking lateral measurements only. Typically, the distance would be approx 100 feet (30 meters) behind the drill-bit, meaning that formation data would be provided only after a formation had been penetrated or traversed. Consequently, the drill-bit may have exited a payzone and the wellbore would have to be deflected back to the optimal location. If critical knowledge of the formation i.e. reservoir structures, fractures, beds or dips and fluids contained therein can be gained in advance before being drilled through this would lead to greater recovery rates due to more effective wellbore placement by increasing the actual drilled footage in the payzone.

In other applications such as gas zone, kick detection, pore pressure analysis or fracture identification, the tolerances between the planned parameters and actual downhole parameters can be very close and variations of 0.2 ppg (0.02 kg/l) can lead to the failure or loss of the well. By being able to detect a kick, or establish a fracture before it is actually drilled through, remedial drilling action can be taken in advance saving time, money and providing a significant safety margin.

Insofar as the prior art is concerned, there are three generic approaches which have attempted unsatisfactorily to overcome the limitations of acoustic logging. First, it is routine to move sensors closer to the borehole to achieve greater lateral proximity or even create contact with the wall of the wellbore. Second, to increase the number of consecutive source and receiver arrays. Lastly to deflect signals into the formation. The prior art has not dealt with the fundamental problem of orienting the acoustic source or electro-magnetic signal to look ahead of the bit or reducing the distance to the bit.

The prior art is limited as they depend on measurements perpendicular to the tool axis, or lateral or orthogonal orientations which cannot see beyond the tool itself irrespective of longitudinal or angular depths. Further, signal transmission and signal propagation is limited to shallow depths of investigation typically no more than a few feet. Lastly, the positioning of the prior art at significant distances behind the bit creates further restrictions insofar as the depth of investigation is severely limited to a zone that has already been drilled. Therefore, drilling has taken place and the wellbore trajectory has already been landed. Any such data acquired at this point is after the event data and the drilling assumption is always that the current formation trend or bed should continue. There are no actual measurements whether direct or inferred until after the bit has penetrated a formation and the logging tools have traversed the said formation.

It is unsatisfactory to depend on source placement or source, receiver placement that is lateral; orthogonal or perpendicular to the tool axis. Such placements do not provide measurements of the formation beyond the near wellbore nor do they provide lookahead data; they simply give information on the geological or formations that have already been drilled and where it is too late to achieve a desired optimal well trajectory. Hence, there is the constant cycling of directional tools to maintain wellbore inclination or azimuth.

To those skilled in the art, it is known that the industry relies on behind the bit data which can be 100 feet (30 meters) or more behind the bit.

Therefore, the prior art does not lend itself to a reliable or certain means of look ahead investigating formations during or immediately prior to their drilling.

Further the prior art generates time-consuming correction cycles of changes in azimuth and inclination in an attempt to retrospectively maintain an optimal well trajectory.

Further, the prior art contributes to an average and unsatisfactory recovery rate of 35% of hydrocarbons as reserves are not located in an optimal manner.

Further the prior art does not detect variations in formations ahead of the bit in real-time.

Further the prior art does not detect variations in formation characteristics such as porosity or fluid content ahead of the bit in real-time.

Further the prior art does not detect gas zones, fractures or water flows ahead of the bit or wellbore in real-time.

Further the prior art does not detect pressure or temperature variations ahead of the bit or wellbore in real-time.

Further the prior art does not automatically allow for a closed-link or automatic troubleshooting of well trajectory placement.

SUMMARY OF THE INVENTION

The present invention has for a principal object to provide an improvement on the prior art wherein the formation or formation characteristic is investigated in advance, that is to say simultaneously with, or immediately after, or immediately before drilling commences but at all times ahead of the drill-bit before the formation or formation feature of interest has been penetrated or traversed.

The present invention optimally orients sources and receivers or transducers which in addition can be placed much closer to the bit or within the bit itself and propagate signals ahead of the bit into formations that have not yet been penetrated or traversed. Data communication may be achieved via a mud-pulsed signal or other wireless transmission or wired to ensure it is received at surface in real-time and wellbore trajectory can be optimized.

The invention seeks to meet the need for a closed-loop real-time look-ahead formation evaluation tool which provides real time formation data beyond the drill-bit. This has not been forthcoming in the behind the bit prior art due to design limitations inherent in the sensor placement, orientation or distance located from the bit.

The present invention seeks to directly investigate formations ahead of the bit and offers optimal wellbore placement using a novel angular/longitudinal source, receiver or transducer orientation which also allows for optimized signal propagation and signal returns according to an axial plane and vertical depth.

The present invention eliminates the uncertainty of post drilling investigation and eliminates the need for corrective directional runs and consequent wellbore tortuosity by providing real-time data which allows the driller to respond much earlier to formation characteristics thereby increasing recovery factors while saving time and money.

It is thus an object of the present invention to provide acoustic formation evaluation tools with lookahead means, enabling the device to give immediate evaluation of a formation to be drilled, or the characteristics of a formation yet to be drilled and, if the tool detects a parameter of interest or a change in a parameter of interest such as porosity, fault or gas zone, to automatically calculate and correct for an optimal well path, and to repeat evaluation until such an optimal well path result is achieved in real-time.

Although sonic investigation is a principal route to characterizing certain formations and their features, the invention is not limited to acoustic means and envisages a further embodiment with additional resistivity investigation means similarly integrated with the look-ahead capability of the tool. These additional means can include electro-magnetic waves suitably combined with acoustic measurements for optimal wellbore placement. Such a combination would allow acoustic or porosity measurements to be correlated with resistance or conductivity measurements for oil, gas and water zone identification.

It is a further object of the present invention to provide a tool capable of simultaneously looking ahead of the bit, taking sonic investigative measurements preferably by an acoustic source and receiver or transducer, and verifying such measurements through a processor arrangement that uses said sonic measurements to detect formation parameters of interest and conducts diagnostics according to a logic circuit in order to ensure the wellbore path is optimized in view of investigated measurement data. If a parameter of interest is detected, the processor will automatically detect whether corrective steps are required to steer/maintain the wellbore in the optimal zone. If the tool finds a significant azimuthal or inclinational divergence, a signal may be sent to the rig-surface or to the location of the operating engineer so that further remedial action can be taken, such as coordinate revisions. A memory mode may store sensor information that can be downloaded at surface when the tool is retrieved, or sent to the surface by telemetry. The tool may also have a built-in link to a mud-pulse telemetry system to allow real-time monitoring of the formation yet to be penetrated.

One or more sources and receivers or transducers may be optimally spaced in a forward looking angular or longitudinal orientation in order to emit at least one sound wave ahead of the drill-bit or ahead of a directional control system or ahead of a tubular during a given time period some of which are reflected back by the formation.

A keyway may provide a channel for wiring from the sensors to the processor and transponder. The wiring can be used to transmit acoustic data retrieved by the acoustic sensors, as well as positional and structural data of formation characteristics and their relative distance from the tool and drill-bit. The keyway may be sealed and filled with a means to absorb vibration such as silicon gel or grease and to maintain wires in position. Similarly, the keyways may be left redundant and as a back-up to a wireless mode of operation.

The transponder converts formation data so that it can be transmitted and is linked to the mud-pulser which transmits the data to surface using a series of binary codes at a given frequency using drilling fluid as means of mud pulsing. Other means of data transfer may be used such as wireless transmission short hop using radio frequency or electro-magnetic pulses or wired drill-pipe. This allows up and downlink of the tool in order to receive and transmit data and commands so as to optimize wellbore placement before formations are traversed.

At surface a transducer may be incorporated within a decoder housing which decodes the binary code and may link to the driller's terminal or may be yet further transmitted by satellite or other means to a remote operations centre.

These and other objects will emerge from the following description and the appended claims.

In one aspect, the look ahead apparatus (50) comprises at least one tool body with means for attaching the tool body (63) directly or indirectly to a drill-bit or support whereby it can be rotated and moved axially along a passage (20), and is characterized by, at least one profiled element (58) which houses at least one source, receiver or transducer that is disposed outwardly and projects forwards at an angle of at least 0.25° or as much as 89.75° (FIG. 5) relative to the horizontal axis of the tool, and (57) is adapted to transmit sound and recognize acoustic velocity signatures from a formation (70) or from a feature of a formation (110,120,130,140) and thereby increase hydrocarbon recovery rates by optimizing wellbore trajectory based on formation data acquired by the receiver or transducer before, during or after a drilling operation occurs but at all times before a formation or formation feature has been penetrated by the drill-bit (70).

The support may typically be a drill string (30) or an extended length of coiled tubing connected via the tool to a drill-bit, as used in downhole operations in oil and gas fields.

In preferred embodiments of the invention, the investigation operation is based on acoustic source, receivers or transducer elements comprising a set of at least one source, receiver combination or transducer optimally configured and oriented to send sound waves beyond a drill-bit and receive acoustic velocity signatures. The tool may be directly or indirectly connected to a drill-bit dependent on requirements. The source, receiver or transducer housing may comprise protective covering, which may be of similar construction to the source, receiver or transducer, but having outer surfaces which are protected by a hardened material. Such protection may simply bear under temperature, pressure or flow acting against it from the inside of a wellbore. In an alternate embodiment, the zone surrounding the housing may be treated to actively receive echo pulses rendering it a sensing zone which allows for a a method of formation evaluation which uses the treated zone to actively send or receive echo pulses.

The sources, receivers or transducers may be provided with a lens surface that may be convex (52a), concave (52b), or planar (52c) according to requirement. The sources, receivers and transducers may be optimally tuned and gated in terms of frequency so that emitted frequencies do not cancel out upon contact with return waves and so that reference measurements are taken to establish background noise which would be suitably excluded from operational time-of-flight calculations. Alternatively, the same sources, receivers and transducers may be received within an additional section of the tool or a separate steel body or behind or ahead such section suitably prepared to provide a means of stabilization or centralization and protection for drilling applications. Further sources, receivers or transducers may be provided with a means to reduce 'ringing' or 'dampening' of the sound waves so as to always ensure the tool is fit-for-purpose.

It is to be noted that the description herein of the structure and operation of sources, receivers and transducers and tool design is applicable generally, irrespective of function, except to the extent that acoustic sources, receivers or transducers may be provided specifically for formation evaluation purposes and replaced by other sensors such as resistivity sensors as required by the drilling operation.

The tool body is typically a cylindrical high grade steel housing adapted to form part of a bottom-hole assembly (BHA). Thus the means for attaching the tool body to the support, whether it is a drill string or coiled tubing, may comprise a screw thread provided on the tool body which is engageable with a drill collar. The attachment to the drill string need not be direct, but may be indirect, as there will typically be many different functional elements to be included in the long and narrow BHA, and the arrangement of the successive elements may vary. The lower end of the BHA may be the drill bit which may be directly connected to the tool and in between there may or may not be a means for directional control such as a rotary steerable system or directional motor. The tool body may be provided with a through passage for the flow of drilling fluid from the drill string.

The sources, receivers and transducers may be protected and housed in a plurality of angular depth orientations directed outwardly of a profiled tool body and at all times ahead of the bit. The sources, receivers and transducers may be received within the profile of the tool body in a source, receiver and transducer recess suitably protected from abrasion, wear and damage by means of at least one protective coating or covering. The protective coating may be steel with HVOF, tungsten carbide, boron nickel or other protection according to requirements. The source, receiver and transducer may be provided with a dampening material or mechanism such as silicon gel or a spring.

The source and receiver or the transducer may then be provided with means for driving the sonic pulses and receiving the echoes from the far formation, near formation or wellbore. The microprocessor control means may be suitably adapted to receive formation data from the source, receiver or transducer and to control the frequency in response thereto. A gating procedure may be suitably incorporated to discard a range of background noise frequencies or by means of establishing a maxima reference measurement and engaging with such a maxima or by means of establishing a measurement and engaging with such a measurement.

Pressure compensation may be provided to handle variations in downhole pressure compared to surface atmospheric conditions where activation is opposed by external pressure. This may comprise a port from a source of drilling fluid into a chamber suitably connected to the area within the tool requiring pressure compensation (not shown).

The system may comprise a microprocessor means for monitoring formation evaluation data and relative positions of formation structures where the microprocessor means may include a means of automatically anticipating any formation or detecting a feature of a formation or detecting a change in the feature of a formation, thereby guiding the directional control system to ensure the optimal trajectory and placement of the wellbore.

The tool normally comprises a plurality of sources and receivers arranged symmetrically around the tool and disposed outwardly at angular orientations. The source and receiver may be configured as an integral transducer or separated as a source to receiver. Two transducers would be on opposite sides of the tool, three transducers would be separated by 120 degrees, four by 90 degrees, and six by 60 degrees. Several tool bodies with sources and receivers could be combined along longitudinal SHA or wellbore spacings, with the object of ensuring the zone of pulsed investigation and the zone of echo capture is optimized. In operation, the lookahead apparatus or tool is typically rotated on the drill string as well as being moved axially along the wellbore.

In accordance with a particularly preferred aspect of the invention, the transducer or source and receiver array is provided with an internal keyway for directing power from a source within the tool and providing communications to and from the sensor receiver. The source of power may be a battery within the tool or within another support for the tool suitably adapted for such purpose. The communications may be a processor within the tool, or at surface or other support for the tool suitably adapted for such purpose. Alternatively or additionally, the source, receiver and transducer or tool body may be provided with a wireless means of communication to an internal or external processor. In each case, the two-way communications provide data transmission, operational refinement and data capture.

In order to keep the source, receiver or transducer clean and prevent the build-up of clogging debris from the drilling operation, the source, receiver or transducer housing may be provided with a specialized coating to minimize the residence or remove such material altogether from the source, receiver or transducer.

In one embodiment the present invention incorporates an optimally oriented and spaced sound based means of formation evaluation which is practically applicable and may be ultrasonic.

In another embodiment of the acoustic lookahead tool housing for other types of sensors such as electro-magnetic is provided within the profile which offers a robust and optimal location. This has not been possible with previous tools due to their inherent design limitations which rely on orientations which are lateral, orthogonal or perpendicular to the tool axis.

The tool may further comprise telemetry means for communicating downhole data and control signals between the tool and a surface interface, which may, among other functions, control the drill string during the formation evaluation operation.

In a further aspect, the invention provides a method of operating a logging apparatus or tool to investigate a formation or parameter of interest ahead of a drill-bit or directional tool or the like to optimally guide and place a wellbore which comprises locating a tool according to the invention in a borehole on a support behind a drill-bit, activating the source, receivers or transducers to receive sonic reflections from the formation and establish data on formations and features thereof, their relative distance, azimuth and size from the tool in a preferred embodiment of a profiled steel tool housing, rotating the tool and moving it axially along the borehole on the drill string or other support, investigating the formation by the sonic means, and continuing the sonic investigation until an optimal wellbore placement is achieved.

In accordance with the method of the invention, the tool may be provided with microprocessor means responsive to formation data received from the acoustic source, receivers or transducers. In this way, a closed loop tool which is capable of detecting formation changes and correcting wellbore direction may be realised. The acoustic source, receivers or transducers may investigate the formation, or investigate a feature of a formation, take reference measurements to establish background noise and may provide data to a surface monitor to signal an opportunity for operator intervention to correct wellbore trajectory if it were not able to do so automatically.

Thus, in the case of the look-ahead tool with acoustic investigation means, acoustic reflections from the formation are detected by a receiver or transducer. Sonic waves may be transmitted from the source and detected by the receiver (or transmitted and received by the transducer) calculated as return times based on differing signature velocities from the formation ahead of the bit. The processor correlates the formation data from the maxima return as well as particular signatures such as dips, formations, allowing for variations in drilling fluid or the formation. The processor uses this data to correlate whether the pre-programmed wellbore trajectory is actually being drilled to an optimal well path based on ahead of the bit formation evaluation. Where the processor detects a formation or feature of interest such as a fault or change in porosity or a gas zone it automatically correlates the two measurements and recalculates an optimal trajectory.

In the case of background noise, the driller may pull the drill-bit off bottom and take a reference survey without drilling which will allow for subsequent drilling noise to be measured. The difference between the two minimum measurements is automatically employed by the processor as background noise or redundant data.

For example, the processor may be programmed with a logic circuit which can be configured in any number of ways so as to optimize performance. An exemplary configuration may involve the circuit to first cross check the off bottom acoustic data and then take drilling measurements. In this way, it can be seen whether there are any changes in the formation or its features. If the maxima return signals show that the formation ahead of the bit is a continuation of the present formation, there is a trend that can be followed. If the data ahead of the bit shows, for example, a change in the dip angle or a formation intersection or gas zone then the tool can alert the user by means of mud pulse telemetry to check the trajectory and action such azimuthal or inclination control as necessary or prompt this through a closed loop directional drilling system. The skilled person will readily appreciate that other procedures may be implemented by the logic circuit within the processor, which can be programmed to cover other scenarios.

In another aspect, the invention provides a lookahead apparatus comprising at least one tool body with at least one set of source and receivers, optionally but not limited to a housing carrying a plurality of acoustic sources and receivers or transducers directed outwardly of the tool body, wherein the acoustic source or receiver or transducer is received within the tool body in a purpose built housing having an open mouth, and means for allowing source acoustic waves to propagate to and from the housing and to and from the wellbore, as well as the near and far formation.

In a still further aspect, the invention provides a lookahead apparatus comprising at least one tool body with said source, receiver or said transducer and a bit body with an acoustic source or receiver or transducer housing carrying a plurality of source, receiving or transducers directed outwardly of the bit body, wherein the source or receiver or transducer or combination thereof is received within the bit body in a chamber having an open mouth, and means for housing, retaining and propagating the acoustic signal transmission from the chamber through the acoustic source or receiver or transducer protection while drilling or off bottom and where the acoustic source or receiver or transducer is provided with an internal keyway open to a source of power and communications.

Additionally, acoustic source and receiver or transducer arrays may be configured optimally by providing longitudinal spacings between the acoustic sources, receivers and transducers.

Additionally or alternatively, other sensor types may replace the acoustic sensor receiver array.

Other aspects of the invention are disclosed in the following specific description of exemplary embodiments of the invention.

BRIEF DESCRIPTION OF THE DRAWINGS

Embodiments of the invention are illustrated by way of non-limiting examples in the accompanying drawings, in which:

FIG. 4 is a 3-D Cube Earth Model from a downhole side view, part cut away to show the invention's ability to look ahead of the bit (180) according to an angular conical condition and detect formations (110, 120, 130) ahead of the bit. FIG. 4 also shows several tool bodies with sources and receivers (50) which can be combined along longitudinal BHA or wellbore spacings, with the object of ensuring the zone of pulsed investigation and the zone of echo capture is optimized;

DETAILED DESCRIPTION OF THE INVENTION

As shown in FIG. 1, an exemplary exploration or production rig comprises a surface structure (10) at the wellhead, a wellbore (20), and a drill string (30) in the wellbore with a bottom-hole assembly (40) at its lower end. The bottom-hole assembly includes a look ahead drilling tool (50) in accordance with the invention, and a drill-bit (60) and formations yet to be penetrated (70) and the object of the invention.

The look ahead tool (50) is illustrated by way of exemplary embodiments in FIGS. 4, 5, 6, 7 and 8, comprising at least one tubular steel body (62) provided with a drilling collar pin connection (63) at its downhole end to enable its direct or indirect connection to the drill-bit (60) and a link to a means of communication to the surface (64) at its other end, which is adapted to be engaged by a further drill collar connection (not shown) to connect it to other elements of the bottom-hole assembly (40), and then to the drill string (35).

The tool body has a profile (58) carrying at least one housing for at least one acoustic source (51) and a receiver (52) assembly capable of looking ahead of the drill-bit (60). The source, receiver or transducer assembly (51, 52, and 53) comprises a number of sources, receivers or transducers disposed symmetrically, radially and at determined angles around the profile of the tool body (50) and according to an angular orientation (57) in relation to the horizontal axis of the tool to enable a depth of investigation condition shown in FIG. 4. The said receivers or transducers take angular sonic measurements that extend beyond the drill-bit (60) and well into formations surrounding (70) and ahead of the wellbore (110, 120, and 130).

Figure 5:
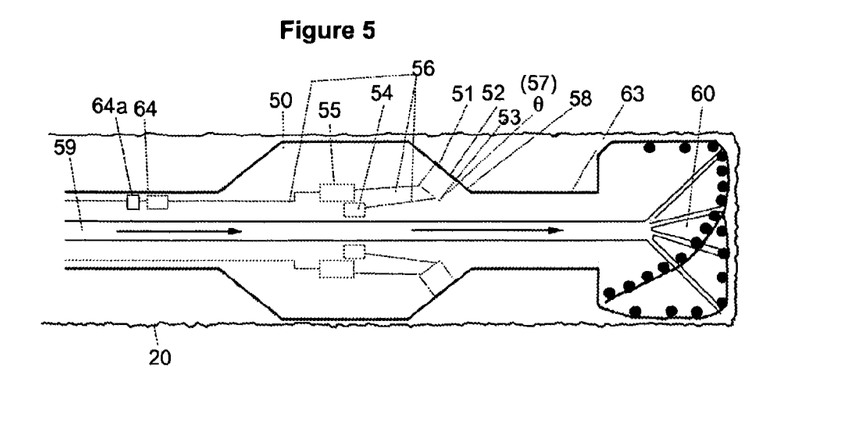
FIG. 5 is a diagrammatic lateral view of the tool part cut away to show source (51) and receiver (52) elements housed (53), and oriented in a novel angular profile (58) according to an angle (57), of the tool of FIG. 1.

An exemplary configuration of the invention in accordance with its specified object is shown in FIG. 5.

Figure 6:
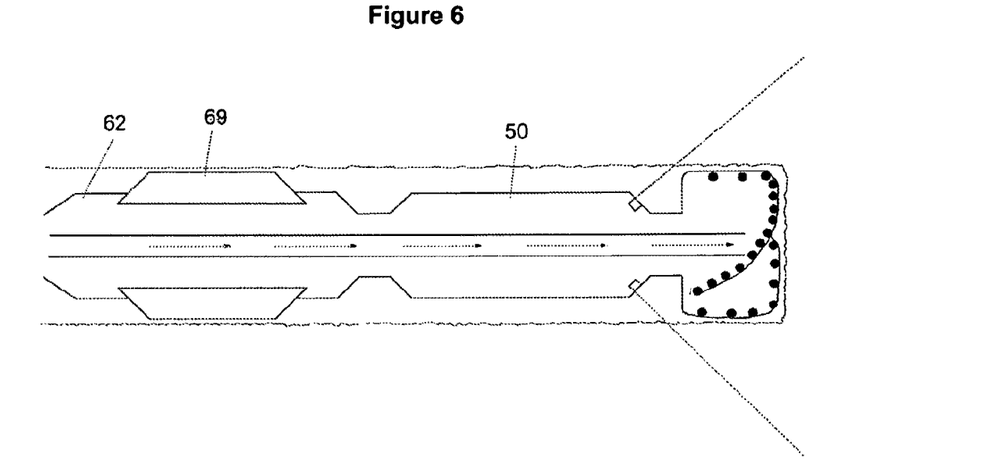
FIG. 6 is a diagrammatic cross section through a lookahead tool in accordance with the invention similar to that shown in FIG. 5, but having a rotary steerable (62) or other wall contact member (69) at the trailing uphole end.
Figure 7:
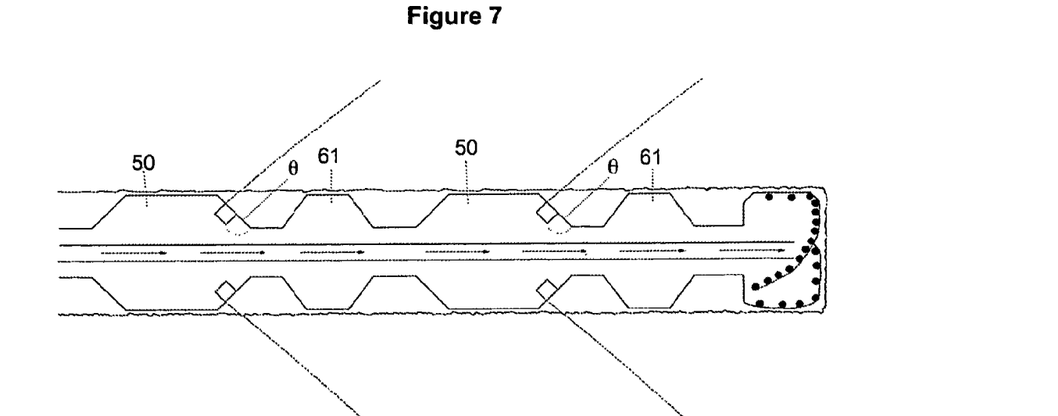
FIG. 7 is a diagrammatic cross section through a lookahead tool in accordance with the invention similar to that shown in FIG. 5, but having an additional stabiliser or protective section (61) at the leading downhole end.

FIG. 6 is a diagrammatic cross section through a lookahead tool in accordance with the invention similar to that shown in FIG. 5, but having a rotary steerable (62) or other wall contact member (69) at the trailing uphole end. Equally, such downhole wall contact may be a roller reamer, an expandable under reamer, pressure containment device;

FIG. 7 illustrates diagrammatically the aforementioned elements of the tool (50), together with a stabiliser section (61) in a cross section view through a lookahead tool in accordance with the invention similar to that shown in FIG. 5, but having an additional stabiliser or protective section (61) at the leading downhole end;

As the acoustic source, receiver or transducer is housed in a profiled element (58), an optimal angle that may be as much 89.5° degrees or as low as 0.5° degrees is defined (57) as indicated in FIGS. 5, 6, 7 and 8, the tool incorporates an acoustic source (51) and acoustic receiver (52). Tool performance is verified using a microprocessor, shown in location (55), which compares data from the source, receiver or transducer (51,52,53) with a pre-programmed wellbore trajectory, thus detecting formations and formation features. The tool is also programmed and automated to conduct diagnostics according to a logic circuit or diagnostic program stored in processor (55) in order to ensure the wellbore is placed optimally. Once corrective steps have been taken, and if the tool indicates that the planned trajectory is not optimal in light of look ahead data, an alert signal is sent via the transponder (64) and mud-pulser (64a) to the rig-surface (10) or to a remote operator so that azimuthal or inclination control action of the BHA (40) can be taken. A memory module (not shown) associated with processor (55) may store acoustic information that can be downloaded at surface when the tool is retrieved, or sent to the surface by telemetry through a transponder (64) and mud-pulser (64a) or by other communication means. A means of powering the source and receivers or transducers is shown by (54).

Figure 9:
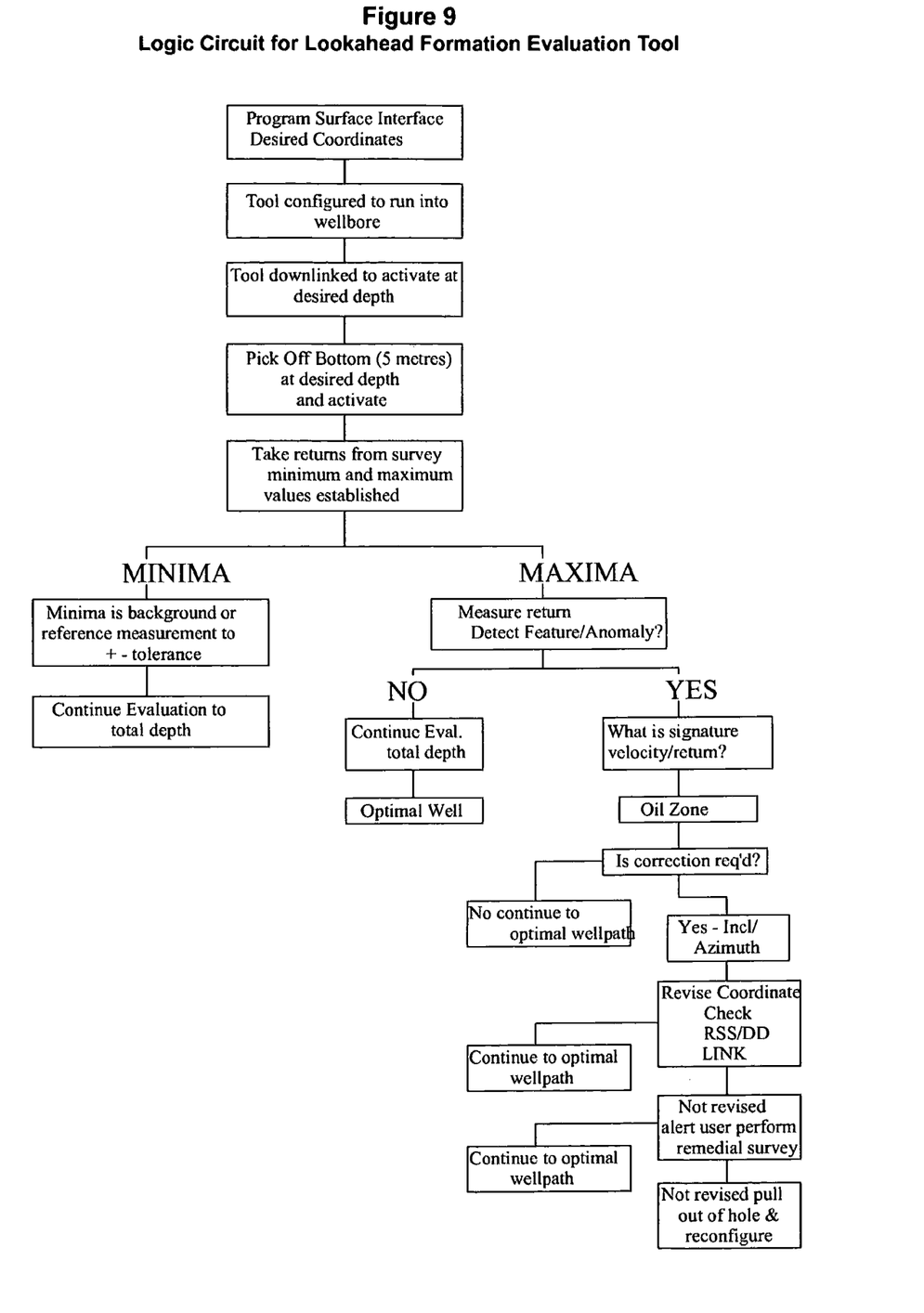
FIG. 9 is an exemplary diagnosis and troubleshooting procedure according to the invention showing background noise exclusions and signal gating.

The tool is provided with a built-in link to a communication system which may be a mud-pulse telemetry system (64) which also serves to monitor real-time formation data and features. One or more sources, receivers or transducers (51, 52,53) are spaced within the tool body profile (58) in order to emit a number of sound waves during a given time period which are reflected back by the near wellbore (40) or by the far formation (110,120,130) in the case of a cavernous formation and picked up by the acoustic reflection receivers or transducers (52,53). The microprocessor (55) establishes formations (110, 120, 130) and formation features (160) through a series of calculations derived from acoustic velocity signatures and compare this to preprogrammed or desired wellbore trajectory. If the two measurements match given user defined tolerances the tool continues to total depth of the wellbore section. Where the formation data do not match the logic circuit dictates a series of diagnostic steps, which are further discussed in relation to FIG. 9 below.

As further shown in FIG. 5, a keyway (56) provides a channel for wiring (56) from the acoustic receivers or transducers (51,52,53) to the processor (55), and also to a transponder (64) which may be connected to a mud-pulser (64a). The wiring is used to transmit formation evaluation data retrieved by the acoustic receivers or transducers (51,52,53) as well formation features (110, 120, 130, 160) from the receivers or transducers (52,53) to the processor (55) and transponder (64) and the mud-pulser (64a). The keyway may be sealed and filled with a means to absorb vibration and maintain wires in position such as silicon gel or grease (not shown).

The transponder (64) converts data from the microprocessor (55) so that it can be transmitted to surface (10) and may be linked to the mud-pulser (64a) which transmits the data to surface using a series of binary codes at a given frequency using drilling fluid as means of mud pulsation. Other means of data transfer may be used such as wireless transmission, short hop using radio frequency to a further mud-pulser or electro-magnetic pulses.

FIG. 7 shows an alternative configuration with a stabilizing or protective profile (61) and shows a central axial through passage (59) for the flow of drilling fluid (not shown) through the whole bottom-hole assembly (40).

The acoustic source, receiver or transducer means (51, 52) or integrated transducer (53), are typically housed within housing (53a) in the tool body (50) in a profiled element (58) at an angular outward disposition of θ(57).

Transducer housing (53) may also be suitably adapted and treated for use of other types of sensor, especially an electro-magnetic sensor to establish resistivity of formation fluids ahead of the drill-bit (60). In such a case, the power, communications and data processing may be optimized to suit resistivity applications.

Figure 4:
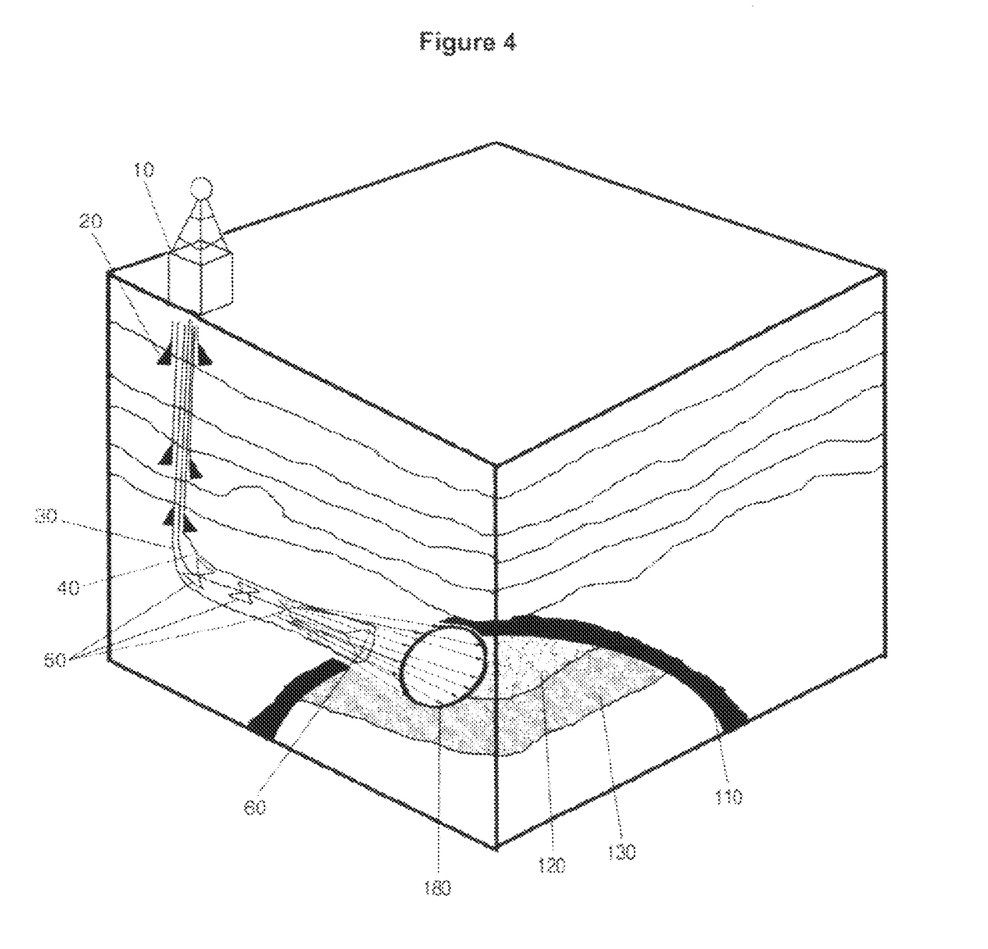

The tool body (50) is a cylindrical high grade steel tube adapted to form part of a bottom-hole assembly (BHA) 40. FIGS. 5, 6 and 7 show a diagrammatic side view of the tool body (50) in embodiments with a stand-alone tool (FIG. 5, 50), the lookahead tool configured with a rotary-steerable (FIG. 6, 50, 62) and a further tool (FIG. 7 50, 61) configured with a stabilizing or protective element. In FIG. 5, at the leading downhole end there is pin connection (63) to a drill-bit, in the centre is a profiled section (58) housing sources, receivers or transducers (51, 52, 53) and control functions (55). In FIG. 6, a further section (62) at the uphole end, with inclination and, directional control members (69), is connected to the tool or the BHA (40). In FIG. 7 at either end of the tool (50) a stabiliser (61) may be placed to stabilize the tool during drilling. Sources, receivers and transducers may be constructed and housed integrally and generally designated as (51,52,53), except that further numbers of receivers may additionally be placed surrounding the source to form a sensing zone (FIG. 4, 50). In the embodiment of an additional electro-magnetic capability, the sources and receivers or transducers generally designated as acoustic may be constructed and housed integrally to send and receive electro-magnetic data. In all embodiments there is at least one surface which is hard faced or coated with a hard abrasion-resistant material. The means for attaching the tool body to a drill-bit comprises a pin screw thread (not shown) provided on the tool body which is engageable with a bit box (not shown).

In this alternative configuration the tool is configured, in addition to investigative capacity, with the stabilising tool body incorporating hard facing cutter blocks to act as a stabiliser. The hard facing acts to prevent cutter abrasion while drilling. This eliminates some of the problems associated with loss of directional control due to an undergauge near bit stabiliser directly behind the drill-bit.

The stabiliser may be directly or indirectly above or below the central sensing section and may be hard-wired or wireless accordingly so as to ensure the mud-pulser (64a) may transmit data to surface (10). The tool may be provided with a mud-pulser as a standalone tool or the mud pulser itself may be provided by a third party as would be the case when a measurement while drilling or logging while drilling suite of tools is located in the BHA below the present invention. The hard wiring configuration of the tool may be changed to suit such an application.

Figure 8:
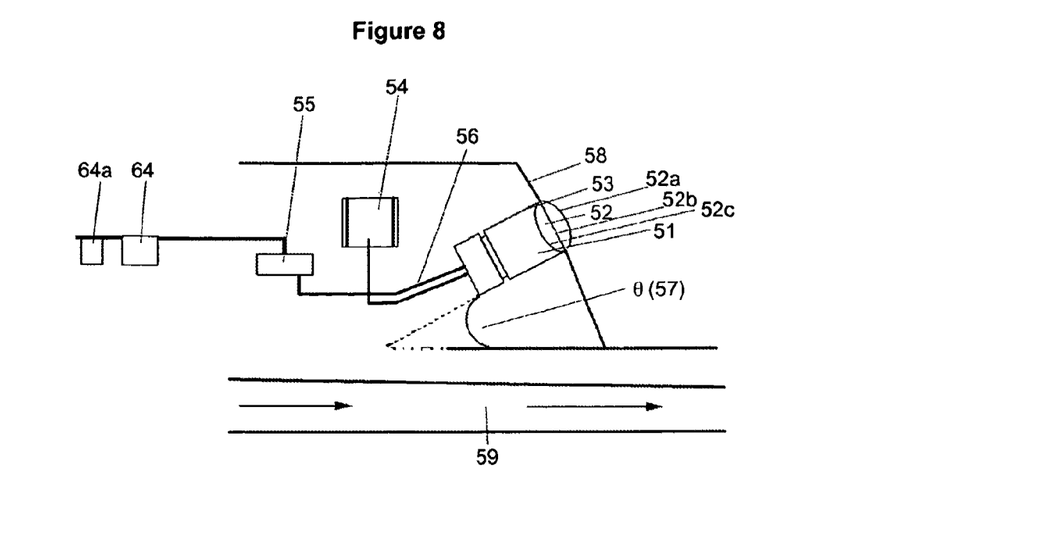
FIG. 8 is an enlargement of part of FIG. 5 showing a source (51), receiver (52) and its housing (53), means of power (54), processor (55), hard-wiring (56) and angular orientation (57) within a profile (58) and internal flow bore (59) and lens surfaces on the sources or transducers (52a, 52b, 52c) with transponder (64) and mud-pulser (64a)
Figure 8A:
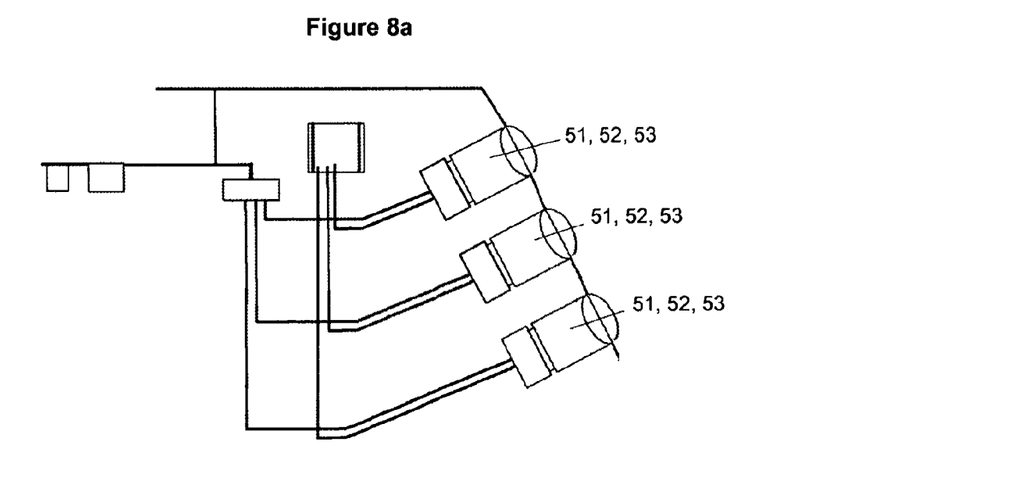
FIG. 8a corresponds to FIG. 8 wherein a plurality of sources, receivers or transducers are housed in the said tool body.
Figure 8B:
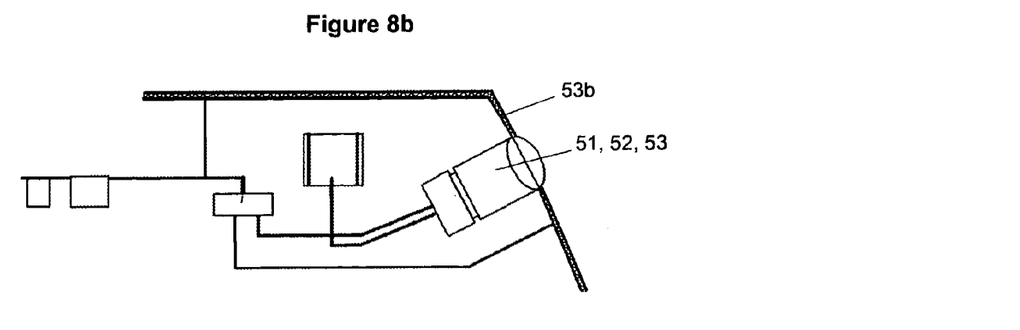
FIG. 8b corresponds to FIG. 8 as an alternate embodiment, wherein the zone surrounding the housing may be treated to actively receive echo pulses rendering it a sensing zone which allows for a a method of formation evaluation which uses the treated zone to actively send or receive echo pulses.

FIG. 8a corresponds to FIG. 8 wherein a plurality of sources, receivers or transducers are housed in the said tool body. FIG. 8b corresponds to FIG. 8 as an alternate embodiment, wherein the zone surrounding the housing may be treated to actively receive echo pulses rendering it a sensing zone which allows for a a method of formation evaluation which uses the treated zone to actively send or receive echo pulses.

As shown in FIGS. 4, 5, 6, 7, 8 and 9, the illustrated example of a tool in accordance with the invention is a lookahead formation evaluation tool which uses a microprocessor (55) and electronic means to determine an optimal wellbore trajectory. Source, receiver or transducer means (51, 52, 53) determine the actual formation characteristics (110, 120, 130, 160) and send corresponding signals back to the processor (55).

As required, the sources, receivers or transducers (51, 52,53) may be protected and housed (53) in a plurality of angular forward orientations (57) directed outwardly of a profiled tool body (58) and at all times ahead of the bit (60) and determined as an optimal orientation based on formation and BHA component considerations. The sources, receivers or transducers may be received within the profile of the tool body in a source, receiver or transducer housing recess (53) that is also suitably protected from abrasion, wear and damage by means of at least one protective coating or covering. The protective coating may be steel with a HVOF coating, tungsten carbide, boron nickel, titanium, epoxy, kevlar or other protection suited to requirements. The sensor may also be provided with a dampening material or mechanism such as silicon gel or a spring (not shown).

The source and receiver or transducer may then be provided with means (54) for driving the sonic pulses and receiving the echoes from the far formation (110,120,130,160), near formation or wellbore (80). The microprocessor control means (55) may be suitably adapted to receive formation data from the sensors (51, 52) and to control the frequency in response thereto. A gating procedure may be suitably incorporated to discard a range of background noise frequencies or by means of establishing a maxima reference measurement and engaging with such a maxima, or by means of establishing any other acoustic velocity signature.

Figure 10:
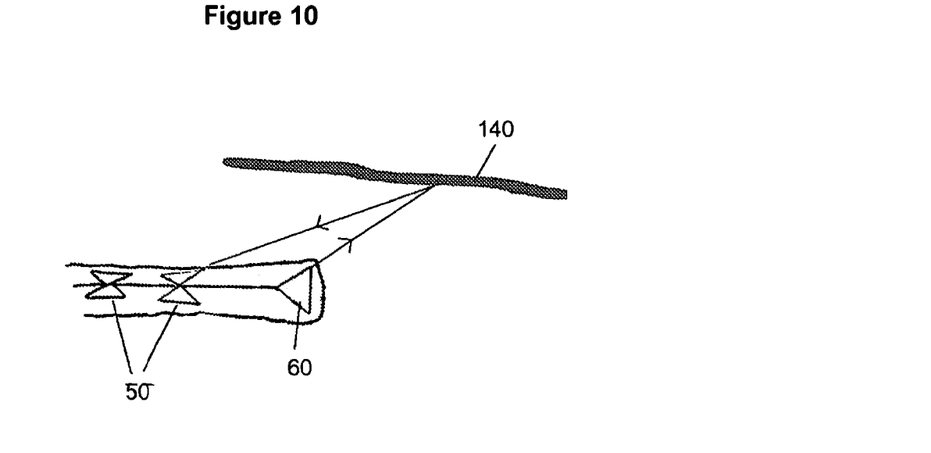
FIG. 10 shows an alternative embodiment with at least one tool body with sources and receivers (FIG. 4, 50) used in association with a drill-bit that has a source, receiver or transducer to send acoustic waves through the formation ahead of the drill-bit itself.

FIG. 10 shows an alternative embodiment wherein the apparatus comprises at least three two bodies and at least one tool body is configured with sources and receivers (51, 52) which are used in association with a drill-bit (60) that has a source, receiver or transducer to send or receive acoustic waves through the formation ahead of the drill-bit itself to be further received by one of the said tool bodies. This allows for greater flexibility of placement and lower angles of investigation to and from the formations ahead of the bit can be probed and such data can be processed by the micro-processor and communications within said tool body.

Figure 11:
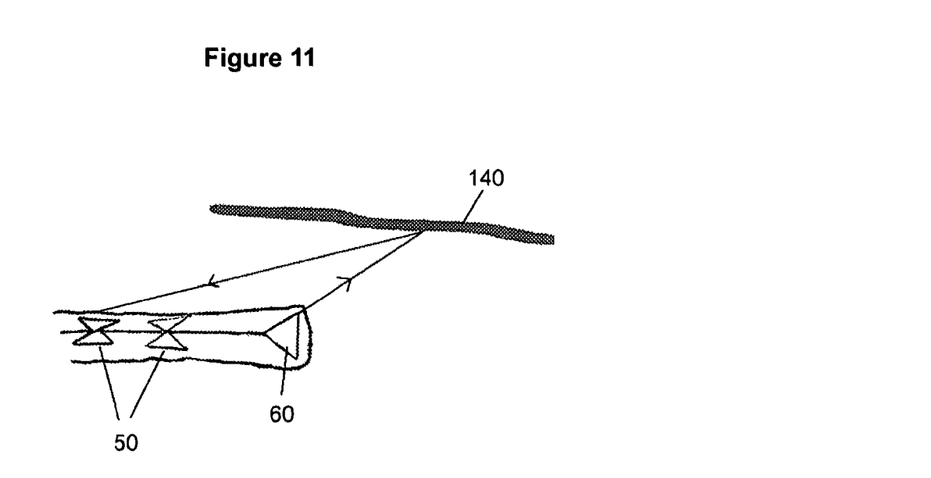
FIG. 11 corresponds to FIG. 10 and shows a secondary tool body with sources and receivers (FIG. 4, 50) used in association with a drill-bit that has a source, receiver or transducer to send acoustic waves through the formation ahead of the drill-bit itself. This secondary tool body has been placed further back from the bit allowing for extended investigation to and from the formations ahead of the bit.

FIG. 11 corresponds to FIG. 10 and shows said apparatus wherein a secondary tool body with sources and receivers (FIG. 4, 50) is used in association with a drill-bit that has a source, receiver or transducer to send acoustic waves through the formation ahead of the drill-bit itself. This secondary tool body has been placed further back from the bit allowing for extended investigation. It can be seen from these embodiments that many configurations are possible and remain within the purpose and scope of the invention which is to at all times look ahead of the bit and obtain data on formations or formation features before the bit has penetrated said formations.

Pressure compensation may be provided to handle variations in downhole pressure compared to surface atmospheric conditions where activation is opposed by a source of external pressure. This may comprise a port from a source of drilling fluid into a chamber suitably connected to the area within the tool requiring pressure compensation (not shown).

The system may comprise a microprocessor means for monitoring formation evaluation data and relative positions of formation structures where the microprocessor means may include a means of automatically anticipating any formation or detecting a feature of a formation or detecting a change in the feature of a formation, thereby guiding the directional control system to ensure the optimal trajectory and placement of the wellbore.

The tool normally comprises a plurality of sources and receivers arranged symmetrically around the tool and disposed outwardly at angular orientations. The source and receiver may be configured as an integral transducer or separated as a source and several receivers known as a 'sensing zone'. Two transducers would be on opposite sides of the tool, three transducers would be separated by 120 degrees, four by 90 degrees, and six by 60 degrees. A number of tool bodies housing said source and receivers could be configured in a plurality of combinations with the object of ensuring the zone of pulsed investigation and the zone of echo capture is optimized. In operation, the lookahead tool is typically rotated on the drill string as well as being moved axially along the wellbore.

In accordance with a particularly preferred aspect of the invention, the transducer or source and receiver array is provided with an internal keyway for directing power from a source within the tool and providing communications to and from the sensor receiver. The source of power may be a battery within the tool or within other support for the tool suitably adapted for such purpose. The communications may be a processor within the tool, or at surface or other support for the tool suitably adapted for such purpose. Alternatively or additionally, the source and receiver or transducer or tool body may be provided with a wireless means of communication to an internal or external processor. In each case, the two-way communications provide data transmission, operational refinement and data capture.

In order to keep the source, receiver or transducer clean and prevent the build-up of clogging debris from the drilling operation, the sensor housing may be provided with a specialized coating to minimize the residence or remove such material altogether.

In one preferred aspect the present invention incorporates an optimally oriented and spaced sound based means of formation evaluation which is practically applicable and may be ultrasonic.

In another aspect of the present invention housing for other types of sensors is provided within the profile which offers a robust and optimal location. This has not been possible with previous tools due to their inherent design limitations which rely on orientations that are lateral, orthogonal or perpendicular to the tool axis.

The tool may further comprise telemetry means for communicating downhole data and control signals between the tool and a surface interface, which may, among other functions, control the drill string during the formation evaluation operation.

In a further aspect, the invention provides a method of operating a logging tool to investigate a formation or parameter of interest ahead of a drill-bit or directional tool or the like to optimally guide and place a wellbore which comprises locating a tool according to the invention in a borehole on a support behind a drill-bit, activating the source or receivers or transducers to emit and receive sound waves accordingly from the formation and establish data on formations and features thereof, their relative distance, azimuth and size from the tool in a preferred embodiment of a profiled steel tool housing, rotating the tool and moving it axially along the borehole on the drill string or other support, investigating the formation by the acoustic sensor or receiver or transducer, and continuing the acoustic velocity investigation until an optimal wellbore placement is achieved.

To those skilled in the art, it is known that the wellhead surface structure (10) includes a control and communications system having an interface for communication telemetry with downhole instrumentation including a transponder and a decoder which decodes data and may be linked directly to the user or driller's terminal. The decoded data may be yet further transmitted by satellite or other means to a remote user or a remote operations centre by means of a telecommunication link. This surface control system allows full communication to and from the downlink and uplink to the invention.

As noted above, the invention provides a method of automatically operating a directional tool according to a processor which detects differences between programmed and actual measurements using data acquired from ahead of the bit.

It is recognized that the tool could be programmed by the skilled person to cover many other scenarios.

Those skilled in the art will appreciate that the examples of the invention given by the specific illustrated and described embodiments show a novel lookahead tool and system and method for formation evaluation ahead of the bit, with numerous variations being possible. These embodiments are not intended to be limiting with respect to the scope of the invention. Substitutions, alterations and modifications not limited to the variations suggested herein may be made to the disclosed embodiments while remaining within the ambit of the invention.

The invention claimed is:

1. A look ahead tool comprising a tool body with means for attaching the tool body for rotation directly or indirectly to drill-bit for axial movement along a well passage comprising:
   at least one housing supporting at least one acoustic source and an acoustic receiver or integrated transducer directed outwardly toward a downhole end of said tool body and
   projecting at an angle ($\phi$) of at least 0.25° and less than 89.75° relative to a central axis of the tool body wherein the source or the transducer transmits sound and wherein the receiver or transducer receives acoustic signature velocities from a formation; and
   at least one microprocessor for processing said acoustic signature velocities using said at least one acoustic source, receiver or transducer to increase hydrocarbon recovery by optimizing wellbore trajectory based on formation data acquired by said acoustic source and said receiver or said transducer before the formation has been penetrated by the drill-bit
   wherein said at least one acoustic source, acoustic receiver or integrated transducer are received within said housing of said tool body, said housing having an open mouth
   wherein said housing comprises a protective covering or protective layers made of a hardened material.

2. A tool as claimed in claim 1, wherein said at least one acoustic source, receiver or transducer is provided with an outer surface that is concave, or convex, or planar.

3. A tool as claimed in 1 wherein an electro-magnetic source and said receiver or integrated transducer send and receive electro-magnetic data to and from the formation ahead of a drill-bit, and said data is processed by said microprocessor.

4. A tool as claimed in claim 1 further comprising: a first tool body to investigate a formation ahead of the drill-bit, and a second tool body to stabilize the tool during drilling.

5. A tool as claimed in claim 1 further comprising: a microprocessor controller adapted to receive data based on acoustic signature velocities recognized by said receivers or said transducers, and detect a formation or formation feature and control a directional tool in response to acquired acoustic data to maximize wellbore footage drilled in productive reservoir zones.

6. A tool as claimed in claim 1 further comprising: a plurality of said sources, said receivers or said transducers directed outwardly of said tool body or separately housed and placed along the drill-string in separate tool bodies.

7. A tool as claimed in claim 1 wherein one of acoustic source, receiver or transducer is housed in a drill-bit.

8. A tool as claimed in claim 1 further comprising: communication means for communicating said acoustic data or electromagnetic and control signals with the microprocessor, and a surface decoder and user interface in real-time to optimize performance.

9. A tool as claimed in claim 1 wherein the means for attaching the tool body comprises a screw thread on the tool body to engage the drill bit, a directional control system, drill collar or coiled tubing.

10. A look ahead tool comprising a tool body with means for attaching the tool body for rotation directly or indirectly to drill-bit for axial movement along a well passage comprising:
    at least one housing supporting at least one acoustic source and an acoustic receiver or integrated transducer directed outwardly toward a downhole end of said tool body and
    projecting at an angle ($\phi$) of at least 0.25° and less than 89.75° relative to a central axis of the tool body wherein the source or the transducer transmits sound and wherein the receiver or transducer receives acoustic signature velocities from a formation; and
    at least one microprocessor for processing said acoustic signature velocities using said at least one acoustic source, receiver or transducer to increase hydrocarbon recovery by optimizing wellbore trajectory based on formation data acquired by said acoustic source and said receiver or said transducer before the formation has been penetrated by the drill-bit and wherein said tool body is configured with a rotary steerable system with a wall contact member at an end.

11. A look ahead tool comprising a tool body with means for attaching the tool body for rotation directly or indirectly to drill-bit for axial movement along a well passage comprising:
    at least one housing supporting at least one acoustic source and an acoustic receiver or integrated transducer directed outwardly toward a downhole end of said tool body and
    projecting at an angle ($\phi$) of at least 0.25° and less than 89.75° relative to a central axis of the tool body wherein the source or the transducer transmits sound and wherein the receiver or transducer receives acoustic signature velocities from a formation; and
    at least one microprocessor for processing said acoustic signature velocities using said at least one acoustic source, receiver or transducer to increase hydrocarbon recovery by optimizing wellbore trajectory based on formation data acquired by said acoustic source and said receiver or said transducer before the formation has been penetrated by the drill-bit wherein the said tool body includes a downhole wall contact member to form one of a roller reamer, an expandable underreamer, a pressure containment device, and a measurement device.

12. A look ahead tool comprising a tool body with means for attaching the tool body for rotation directly or indirectly to drill-bit for axial movement along a well passage comprising:
    at least one housing supporting at least one acoustic source and an acoustic receiver or integrated transducer directed outwardly toward a downhole end of said tool body and
    projecting at an angle ($\phi$) of at least 0.25° and less than 89.75° relative to a central axis of the tool body wherein the source or the transducer transmits sound and wherein the receiver or transducer receives acoustic signature velocities from a formation; and at least one microprocessor for processing said acoustic signature velocities using said at least one acoustic source, receiver or transducer to increase hydrocarbon recovery by optimizing wellbore trajectory based on formation data acquired by said acoustic source and said receiver or said transducer before the formation has been penetrated by the drill-bit;

wherein said tool body is provided with an internal keyway leading to a source of power communications inside or outside the tool and capable of sending an alert signal to a user.

13. An automated method of operating a look ahead tool to acquire formation data and optimally place a wellbore or tubular or sand screen, or drilling, completion or production system or any downhole device comprising:

locating the tool being supported on a drill-bit and drill-string and a surface interface controls and exchanges data with the drill string during the formation evaluation operation according to a program to deliver a desired wellbore placement and activating an acoustic source, receiver or transducer to send and receive formation data, rotating the tool and moving the tool axially along the borehole on the drill-bit, receiving data from the receiver and detecting a formation feature:

comparing the formation feature with a pre-programmed wellbore trajectory and automatically alerting an operator or changing the conditions of a directional control system in response thereto and continuing the formation evaluation until an optimal wellbore placement is achieved using logic programming to diagnose and correct common errors or failures.

14. An automated method of operating a look ahead tool to optimally place a wellbore or tubular or sand screen, or drilling, completion or production system or any downhole device comprising:

locating the tool on a drill-bit or support in a wellbore;

activating an acoustic source, receiver or transducer to send and receive formation data rotating the tool and moving the tool axially along the borehole on the drill-bit or support receiving data from the receiver and continuing the formation evaluation until an optimal wellbore placement is achieved using logic programming to diagnose and correct common errors or failures;

wherein formations are detected as rock types, earthen formations or lithologies with a feature of interest including one or more of porosity or a change in porosity, permeability or a change in permeability, an oil zone, a gas zone, a water zone, a fracture, a fault, a dip, a bed, a vugular formation, an anticline, a syncline or a trap.

15. An automated method of operating a look ahead tool to optimally place a wellbore or tubular or sand screen, or drilling, completion or production system or any downhole device comprising:

locating the tool on a drill-bit in a wellbore;

activating an acoustic source, receiver or transducer to send and receive formation data rotating the tool and moving the tool axially along the borehole on the drill-bit, receiving data from the receiver and continuing the formation evaluation until an optimal wellbore placement is achieved using logic programming to diagnose and correct common errors or failures wherein said tool detects a pore pressure regression and anticipates a drilling fluid loss before drilling fluid enters the formation.

16. An automated method of operating a look ahead tool to optimally place a wellbore or tubular or sand screen, or drilling, completion or production system or any downhole device comprising:

locating the tool on a drill-bit in a wellbore;

activating an acoustic source, receiver or transducer to send and receive formation data.

rotating the tool and moving the tool axially along the borehole on the drill-bit, receiving data from the receiver and continuing the formation evaluation until an optimal wellbore placement is achieved using logic programming to diagnose and correct common errors or failures;

wherein said tool body is treated with a surface treatment to actively send or receive echo pulses rendering it a sensing zone.

17. An automated method of operating a look ahead tool to optimally place a wellbore or tubular or sand screen, or drilling, completion or production system or any downhole device comprising:

locating the tool on a drill-bit in a wellbore;

activating an acoustic source, receiver or transducer to send and receive formation data rotating the tool and moving the tool axially along the borehole on the drill-bit, receiving data from the receiver and continuing the formation evaluation until an optimal wellbore placement is achieved using logic programming to diagnose and correct common errors or failures;

wherein the tool detects a highly pressurized zone and anticipates a kick or influx before entering a wellbore.

18. An automated method of operating a look ahead tool to optimally place a wellbore or tubular or sand screen, or drilling, completion or production system or any downhole device comprising:

locating the tool on a drill-bit or support in a wellbore;

activating an acoustic source, receiver or transducer to send and receive formation data rotating the tool and moving the tool axially along the borehole on the drill-bit or support, receiving data from the receiver and continuing the formation evaluation until an optimal wellbore placement is achieved using logic programming to diagnose and correct common errors or failures;

wherein the acoustic source, receiver or transducer is connected to a processor and a directional control system;

further comprising: performing a diagnostic and troubleshooting procedure.

19. An automated method of operating a look ahead tool to optimally place a wellbore or tubular or sand screen, or drilling, completion or production system or any downhole device comprising:

locating the tool on a drill-bit or support in a wellbore;

activating an acoustic source, receiver or transducer to send and receive formation data Rotating the tool and moving the tool axially along the borehole on the drill-bit or support, receiving data from the receiver and continuing the formation evaluation until an optimal wellbore placement is achieved using logic programming to diagnose and correct common errors or failures;

and establishing background noise and establishing minimum noise values to exclude from operational calculations.

* * * * *